(12) United States Patent
Kaas

(10) Patent No.: US 6,459,087 B1
(45) Date of Patent: Oct. 1, 2002

(54) SENSOR DEVICE FOR INTENSITY MEASUREMENT OF UV LIGHT AND A PHOTOCHEMICAL UV TREATMENT SYSTEM

(76) Inventor: Povl Kaas, Th. Nielsens Gade 11 G, DK-7400 Herning (DK)

( * ) Notice: Subject to any disclaimer, the term of this patent is extended or adjusted under 35 U.S.C. 154(b) by 86 days.

(21) Appl. No.: 09/626,916

(22) Filed: Jul. 27, 2000

Related U.S. Application Data

(63) Continuation-in-part of application No. PCT/DK99/00039, filed on Jan. 27, 1999, now abandoned.

(30) Foreign Application Priority Data

Jan. 27, 1998 (DK) .............................................. 0116/98

(51) Int. Cl.⁷ .................................................. G01J 1/58
(52) U.S. Cl. .......................... 250/372; 250/373; 422/24; 385/12
(58) Field of Search ............................ 250/372, 455.11, 250/373; 422/24, 186.3; 385/37, 49, 88, 12

(56) References Cited

U.S. PATENT DOCUMENTS

| 4,103,167 A | 7/1978 | Ellner |
| 4,201,916 A | 5/1980 | Ellner |
| 4,403,826 A | 9/1983 | Presby |
| 5,862,273 A | * 1/1999 | Pelletier ....................... 385/12 |

FOREIGN PATENT DOCUMENTS

| EP | 0 531 159 | 3/1993 |
| WO | 95/19553 | 7/1995 |

* cited by examiner

Primary Examiner—Constantine Hannaher
Assistant Examiner—Timothy Moran
(74) Attorney, Agent, or Firm—Jacobson Holman, PLLC

(57) ABSTRACT

A device for light intensity measurement of the electromagnetic radiation from a UV lamp in a container including light guides and respective photodetectors. The light guides comprise two dosed light guides arranged in parallel with the lamp, preferably in the entire length, and two differently dosed edge glass filters enclosing each of the light guides, while a photodetector is positioned at one end of each of the light guides. The device allows measurement of predefined wavelengths of emitted electromagnetic radiation along the entire lamp. The device relates to a reaction container with UV lamps and intensity sensor, adapted for disinfection or photochemical treatment of flowing water.

18 Claims, 10 Drawing Sheets

SENSOR DEVICE FOR INTENSITY MEASUREMENT OF UV LIGHT AND A PHOTOCHEMICAL UV TREATMENT SYSTEM

CROSS REFERENCE TO RELATED APPLICATIONS

This is a continuation-in-part of International Patent Application PCT/DK99/00039 with an international filing date of Jan. 27, 1999, now abandoned. This application is based on application No. 0116/98 filed in Denmark on Jan. 27, 1998, the contents of which are incorporated hereinto by reference.

BACKGROUND OF THE INVENTION

1. Field of the invention

The present invention relates to a sensor device for intensity measurement of the electromagnetic energy from a lamp device comprising at least one UV lamp preferably of the type arranged in a container in connection with disinfection or photochemical treatment of flowing water, wherein the light intensity is measured using light guide means and sensor means. The invention moreover relates to a UV treatment system, preferably a UV disinfection system or photochemical reaction system, comprising a lamp device with evenly arranged UV lamps and a device for intensity measurement.

2. Description of the Prior Art

U.S. Pat. No. 4 201 916 teaches a sensor device for intensity measurement and a reaction container adapted for disinfection or photochemical treatment of flowing water, wherein the light intensity is measured using light guide means and sensor means, and where the ultraviolet light from the UV lamps in a UV treatment container is measured in a tube opening in the container wall adjacent one of the UV lamps in the container. The position of this tube opening and thereby the measuring point relative to the lamps are selected such that, based on the light radiation characteristic of the UV lamps, the measurement may be expected to be as representative as possible. Most UV lamp manufacturers state a non-uniform light distribution relative to the length of the lamp, particularly in case of low-pressure lamps of U-shape or low-pressure lamps of lengths above 1 meter. Measurement of one UV lamp by a single point measurement of the intensity of UV light, the UV lamp device being presumed to obey a uniform light distribution characteristic, provides only an approximately correct measurement.

EP-A-0 531 159 describes a light detector in which a fluorescent fiber is used for the detection of light of low intensity. The fibers are secured to a panel, which serves as a concentrator or a light collector.

U.S. Pat. No. 4,103,167 discloses a method employing a large number of photodiodes. This method calls for complicated measures without offering the prospect of measuring the real intensity.

In cylindrical containers with more than one UV lamp, e.g. for disinfection of water or other forms of liquids, it is impossible to measure the real energy per volume, and how much UV energy is present at the weakest points in the system by means of only a single point light sensor mounted on the cylindrical container wall.

To be certain that the system carries out a complete disinfection of the water flowing through it, a minimum illumination of the water must be ensured. It has been found in this connection that bacteria, if any, in the water are inactivated by an illumination of at least 5.4 mJ/cm UV energy at a wavelength $\lambda=253.7$ nm.

However, it is a problem if there are areas in the container that are not sufficiently illuminated because of one or more defective or malfunctioning UV lamps. To guarantee a minimum of UV illumination of the entire container, the container is illuminated with an UV illumination that is somewhat above the minimum value, which represents an excess of energy consumption and an additional cost burden on the operation of such systems. The high load of the individual UV lamps moreover has the effect that the service life of the lamps is shortened, which in turn adds to the maintenance costs.

The problems outlined above are even more pronounced in ducts or channel systems where the UV lamps—typically mounted in cartridges—are positioned vertically in the channel or in its longitudinal direction. The channels have a rectangular cross-section, and the water flow in them is horizontal in the longitudinal direction of the channels.

UV irradiation of a sensor, that serves to convert the radiation into an electrical signal, may be a problem in case the sensor comprises an ordinary photodiode, which is thereby exposed to a high UV light energy. Even silicon monocrystal, generally considered as the most resistant to UV light among photodiodes, very quickly develops dark spots due to burning by the relatively short waves. When dark spots occur on the crystal, the measurement is wrong, as the calibration of the current signal relative to the UV light energy no longer holds. The error may be corrected by recalibrating the UV sensor. However, after some time, the measurements loses reliability to such extent, that even frequent recalibration of the UV intensity sensor can no longer remedy the problem, and the sensor will have to be replaced.

It is an object of the invention to provide a device for measuring the intensity of the electromagnetic energy from a lamp device having one or more UV lamps in a reaction system, which provides a more accurate and reliable intensity measurement, and which is more economical in operation and maintenance.

SUMMARY OF THE INVENTION

The invention, in a first aspect, provides a sensor device for intensity measurement of ultraviolet (UV) light inside a container carrying a flow of a liquid, comprising a light guide means and a photodetector means, wherein said light guide means comprises two doped light guides, and two differently doped edge glass filters, each of said edge glass filters enclosing a respective one of said light guides, and wherein said photodetector means comprises a respective photodetector positioned at a first end of each of said light guides.

With a device according to the invention it is possible to measure predefined wavelengths of emitted electromagnetic energy along the entire lamp, whereby the total emitted light intensity from the lamp may be measured. The two doped edge glass filters absorb the UV light below a certain wavelength and thus merely allow light having a greater wavelength than the absorption value of the edge glass to pass. The irradiations with which the two light guides are illuminated, thus exhibit different wavelengths. The intensity of the UV illumination of the two light guides is measured by sensor means, which are arranged at the ends of the light guides.

The light guides in a device according to the invention are doped such that the UV light passing through the edge glasses and into the light guides is converted into radiation at wavelengths that are less harmful to the sensor. This results in a considerably longer service life of the sensor means.

For an accurate measurement to be achieved, it is important that there is no great loss of UV light across the edge glass filter. Experiments with an intensity sensor according to the invention have established, that a passage of UV light of more than 92% can be achieved, which is considerably better compared to that of known UV intensity sensors. In addition, a device according to the invention admits UV light from a wide incidence angle or opening angle.

In a preferred embodiment of a light guide device consisting of two light guides, the total opening angle is thus 320° per light guide. It has been found that the sensitivity to light incident from various directions around one light guide device is:

0 to $\pm 145° \geqq 95\%$ and from $145°$ to $160° \geqq 80\%$

A light guide device having two light guides in pairs, i.e. total of four light guides may be adapted for an opening angle per light guide of $\pm 115°$. In this case the sensitivity is:

$0°$ to $\pm 105° \geqq 95\%$, and from $\pm 105°$ to $\pm 115° \geqq 80\%$

This is a considerable, extremely satisfactory sensitivity for a light intensity sensor.

In order to further reduce the loss of light in the light guides, reflection means are arranged at the other end of the light guides in a preferred embodiment.

In a preferred embodiment for UV disinfection, the first edge glass filter is doped to a filter wavelength of about 245 nm, and the second edge glass filter is doped to a filter wavelength of about 260 nm. This means that a small bandwidth of between $\lambda = 245-260$ nm is achieved in connection with the measurement of the UV light. Taking the measured signal from the first light guide and subtracting from it the corresponding signal from the second light guide gives a signal which is representative for the level of the intensity of light having $\lambda = 253.7$ nm.

Other edge glasses having a different doping may be used, if another bandwidth and/or another nominal value of the representation signal is desired, e.g. for purposes of photochemical processes. This may be attractive particularly in connection with e.g. photochemical systems for removal of chloramines, THM and AOX in swimming pool water, in case chlorine is used as a disinfectant, it being possible to select two different edge glasses for defining a range which is within the narrow wave range of a doped intermediate pressure lamp which is used in connection herewith.

In a preferred embodiment, one or both light guides are dopes for converting ultraviolet light fed through the edge glass filters into visible light, preferably with a wavelength of 430–470 nm. This makes it possible to use an ordinary and inexpensive photodiode, sensitive to light in the blue range and having a long service life. Thus, recalibration will not be needed, since such photodiodes can give a substantive, accurate current signal for an extremely long time. According to a particularly advantageous embodiment, the sensor means comprises silicon or silicone photodiodes. Another essential advantage is of course that a silicon photodiode having a high sensitivity in the blue range avails itself to exposure by visible light, i.e. radiation in a range that will not degrade the sensor, as would be the case under exposure to UV light energy at $\lambda = 253.7$ nm.

In systems with many UV lamps and consequently a large diameter it is an advantage for the purpose of achieving a high resolution that the light guide means comprises two or more light guides arranged in pairs with associated doped edge glass filters. This provides a greater total opening angle.

In a preferred embodiment, the two edge glass filters enclosing the light guides are embedded in a jacket of a transparent material, preferably quartz glass, having two or more conduits for respective edge glass filters, which conduits are arranged in pairs. This provides a form of light guide cable for light intensity measurement. This cable may be produced in lengths from 10 mm up to 6000 mm corresponding to the lengths of the lamps.

In case of a large number of lamps or high power lamps of e.g. 1 kW light energy or more, the intake of light energy is so great that saturation may occur in the electronics of the controller. An outer shield of a transparent material, preferably quartz glass doped to a grey filter, is useful for adapting the input of light to the input range of the light intensity sensor, in order that the light intensity sensor may hereby be used at higher levels of light energy. A grey filter with e.g. 5% linear attenuation or 10% linear attenuation, etc. may be selected according to the level of light energy foreseen.

It will be appreciated that the device according to the invention provides a UV sensor with a wide potential field of application. Thus, the device may be used for measuring the UV intensity in confinements where a specific UV energy is desired for inactivating e.g. micro fungi or bacteria, such as in the tobacco, food and cheese industries, laboratories and hospitals. Since light guides may be manufactured in lengths of up to about 10000 meters, and since they are relatively flexible, this opens up great possibilities of measuring correctly where this is impossible or impractical by other means. Light guides may be manufactured with a diameter as low as $50\mu$, which also contributes to the usefulness of the invention.

The invention may also be applied in connection with conveyors, e.g. conveyor belts for advancing food products before and during packaging, e.g. in the bread and fish industries. Here, a device according to the invention may be placed in the entire length of the conveyor channel at the weakest point.

Furthermore, the invention may be applied in connection with ventilation systems where it is desired to treat the air for controlling microorganisms. Devices according to the invention may thus be placed in the ventilation channels at expedient points.

Another application of the invention is for water treatment in channel systems or long pipe systems with many lamps, where it has not previously been possible to obtain any satisfactory measurement of the UV intensity.

Also, the invention may very advantageously be applied in connection with UV light treatment of patients, e.g. psoriasis patients. The flexible light guide device may be arranged on the patient exactly where the treatment is to be performed.

The invention, in a second aspect, provides a photochemical UV treatment system, comprising a container carrying a flow of a liquid, which container is provided with at least one UV lamp, and a sensor device for intensity measurement of ultraviolet (UV) light inside said container, said sensor device comprising a light guide means and a photodetector means, wherein said light guide means comprises two doped light guides, and two differently doped edge glass filters, each of said edge glass filters enclosing a respective one of said light guides, and wherein said photodetector means comprises a respective photodetector positioned at a first end of each of said light guides.

In a UV treatment system comprising a reaction container of circular or polygonal cross-section, having two or more UV lamps arranged in a circle, the center is likely to be the most weakly illuminated point in the container. By placing the intensity sensor at this point, the lowest value of the effective light intensity may be measured with extremely satisfactory accuracy.

In containers including only one UV lamp, this lamp is placed in the center, and the intensity sensor is placed adjacent the container wall. In systems having a channelshaped container with at least one intensity sensor, this is placed between the lamps and the container wall.

The number of UV lamps depends on the size and capacity of the system and on the translucency (light absorption) of the water/liquids. In case of water having a low translucency the distance between the UV lamps/from the UV lamps to the center must be relatively small, about 70 mm. Conversely, if the water has a high translucency, the distance may be increased to about 160 mm. In a preferred embodiment, the inner side of the container is reflective so that the UV radiation is directed toward the center where the light intensity is measured.

In case of larger containers or where more closely spaced UV lamps are required, the UV lamps are arranged in at least two concentric rings in such a manner that none of the lamps shade each other relative to the centrally positioned device for light intensity measurement.

BRIEF DESCRIPTION OF THE DRAWINGS

The invention will be described more fully below with reference to the accompanying drawings, in which.

BEST MODE FOR CARRYING OUT THE INVENTION

All figures are schematic and not necessarily to scale and illustrate only those parts which are essential in order to enable those skilled in the art to understand and practice the invention, whereas other parts are omitted from the drawings for the sake of clarity.

Figure 1:
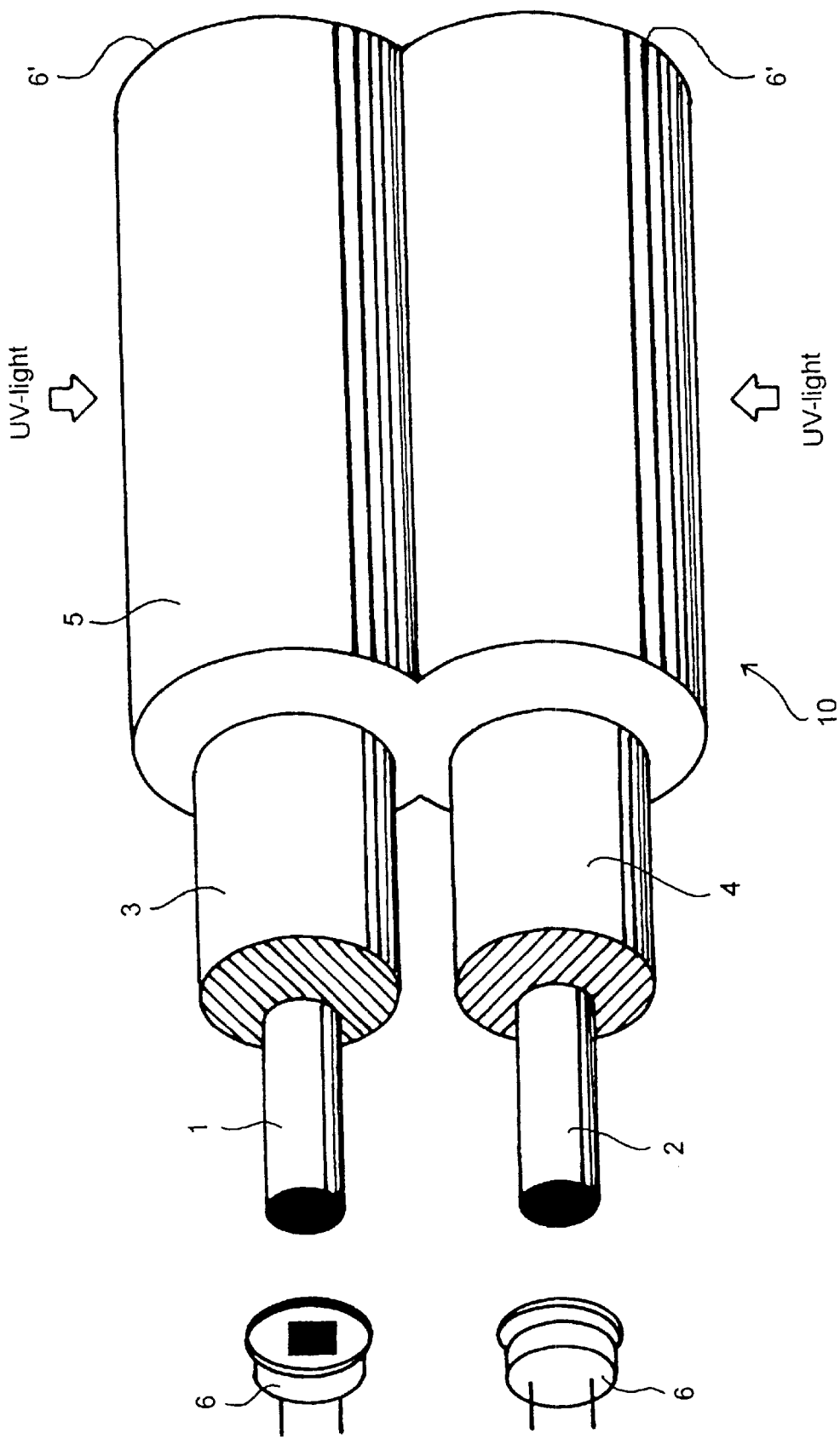
FIG. 1 shows a light guide cable for intensity measurement of electromagnetic energy according to a first embodiment of a device for intensity measurement according to the invention.

Reference is now made more particularly to FIG. 1, which shows a cable 10 for light intensity measurement according to a first embodiment of a device according to the invention. The cable 10 is composed of a first and second doped silicate light guides 1 and 2 capable of converting electromagnetic radiation at $\lambda \approx 253.7$ nm into electromagnetic radiation at $\lambda \approx 430$ nm. The light guides 1 and 2 are closely surrounded by a first edge glass 3 doped to an absorption value of $\lambda \approx 245$ nm and a second edge glass 4 doped to an absorption value of $\lambda \approx 260$ nm, respectively. The edge glasses 3 and 4 are inserted into two conduits or channels in a jacket 5 of quartz glass. At the end of each of the light guides 1, 2 there is arranged a photodiode 6 which has a great sensitivity in the blue range of the light spectrum and which monitors the amount of light in each of the light guides 1, 2.

The jacket 5 is irradiated with electromagnetic energy in the form of UV light which passes through the quartz glass of the jacket and through the edge glass filters 3 and 4 and further into the light guides 1 and 2. The edge glasses 3 and 4 are doped with different absorption values so that they just allow UV light with a certain wavelength to pass. The first edge glass 3 is doped to an absorption value of $\lambda \approx 245$ nm, and the second edge glass is doped to an absorption value of $\lambda \approx 260$ nm.

The UV light with which the first light guide is irradiated is thus UV light with $\lambda \geq 245$ nm, and the UV light with which the second light guide 2 is irradiated is UV light with $\lambda \geq 260$ nm.

The light guides 1 and 2 are doped so that the UV light is converted into light in the visible range. A photo sensor 6 sensitive to blue light is arranged at one end of each of the light guides 1 and 2. It is an ordinary and inexpensive photodiode 6, as the conversion of the UV light in the light guides 1 and 2 means that no special demands are made on the photo sensors 6. Reflection means 6' may be arranged at the other end of the light guides 1, 2 for reducing the loss of light in the light guides.

Figure 2:
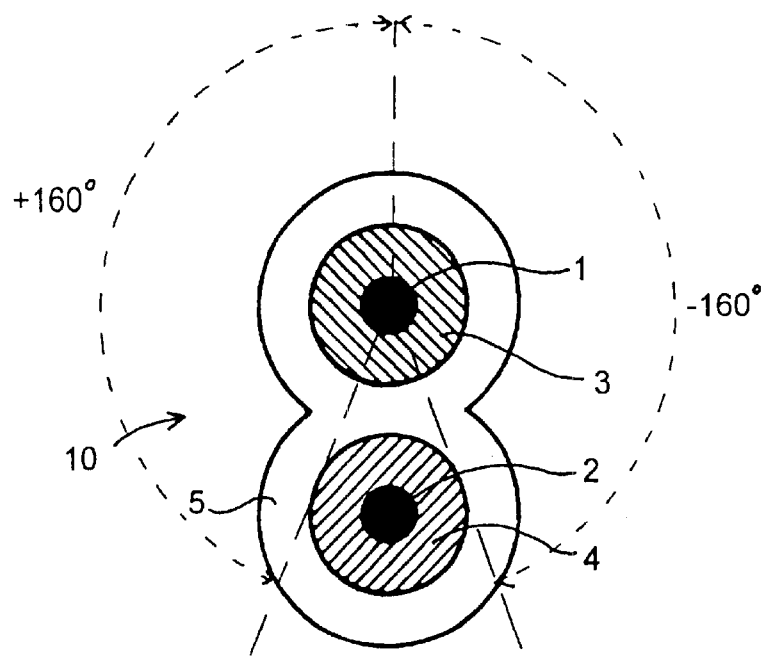
FIG. 2 shows a cross-section of a cable as shown in FIG. 1.
Figure 3:
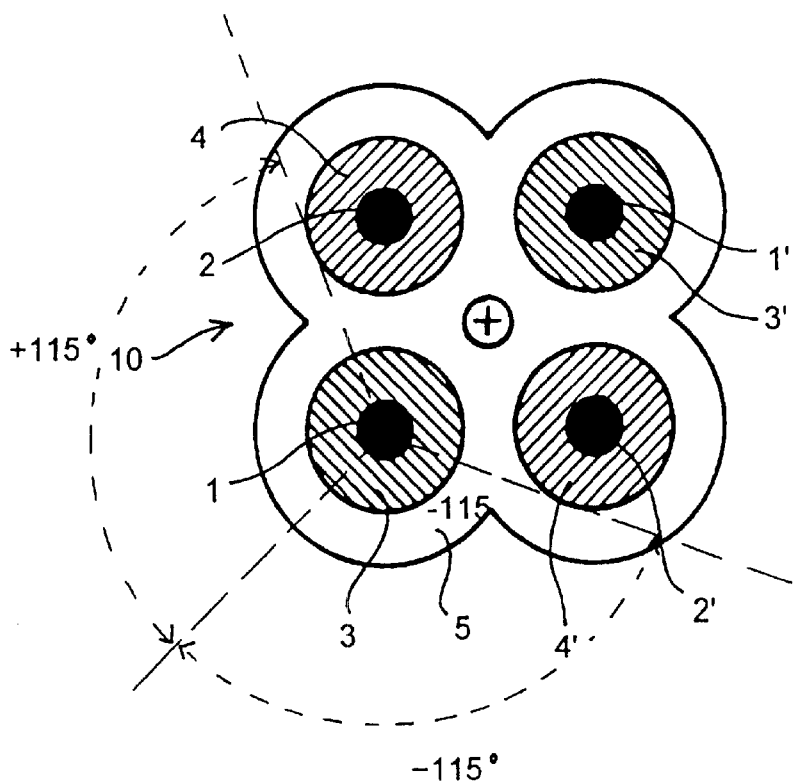
FIG. 3 shows a cable according to a variant of the first embodiment.

FIG. 2 shows a cross-section of the cable in FIG. 1. FIG. 3 shows a variant of the cable-shaped preferred embodiment of the invention, which contains two sets of light, guides as indicated by 1, 2 and 1', 2', respectively. The jacket 5 of quartz glass is provided with four conduits or channels for housing the edge glass filters 3, 4 in this embodiment. The light guides 1, 1', 2, 2' and associated edge glass filters 3, 3', 4, 4' are arranged such that there are two light guides 1, 2; 1', 2; 1, 2', 1', 2' with a first and a second edge glass filter at each side of the cable 10. This results in a uniform measurement from both types of doped edge glass filters 3, 4.

Figure 9:
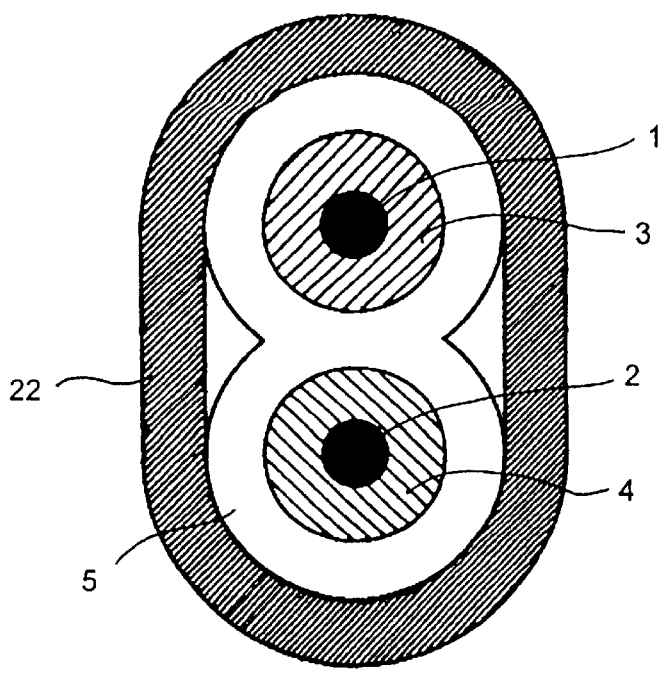
FIG. 9 shows a cross-section similar to the view in FIG. 2, of an embodiment where the cable is provided with a grey filter.
Figure 10:
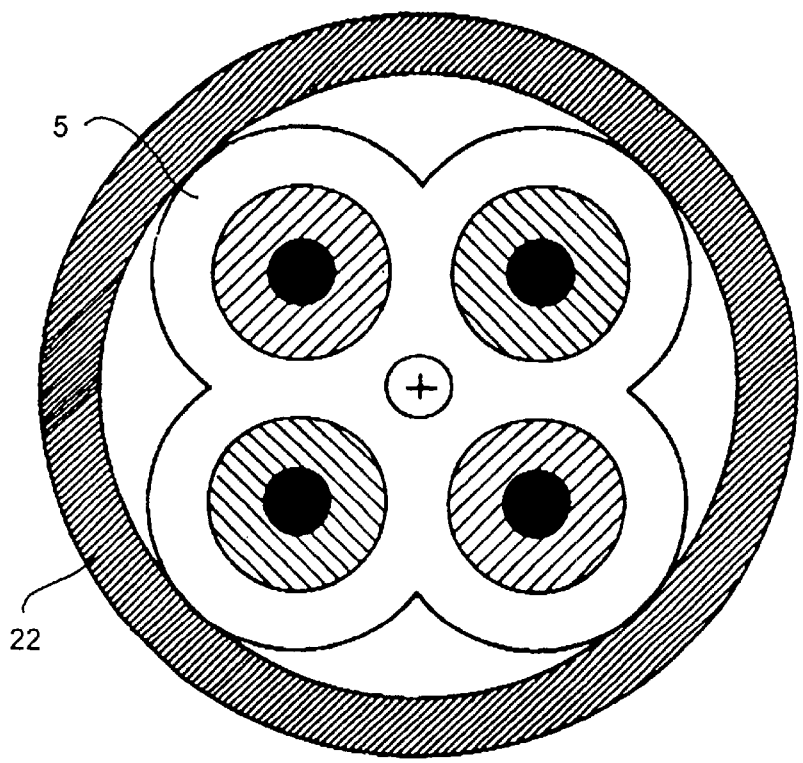
FIG. 10 shows a cross-section similar to the view in FIG. 3, of an embodiment where the cable is provided with a grey filter.

In a preferred embodiment of the light intensity sensor, adapted for use in connection with a large number of lamps or high power lamps, e.g. of 1 kW light energy and more, the sensor is provided also with an outer shield or jacket 22, said jacket being doped to a grey filter, cf. FIGS. 9 and 10. Based on the light energy, a grey filter with e.g. 5% attenuation or 10% attenuation, etc. may be selected, thereby avoiding saturation of the associated electronic controller.

Figure 4:
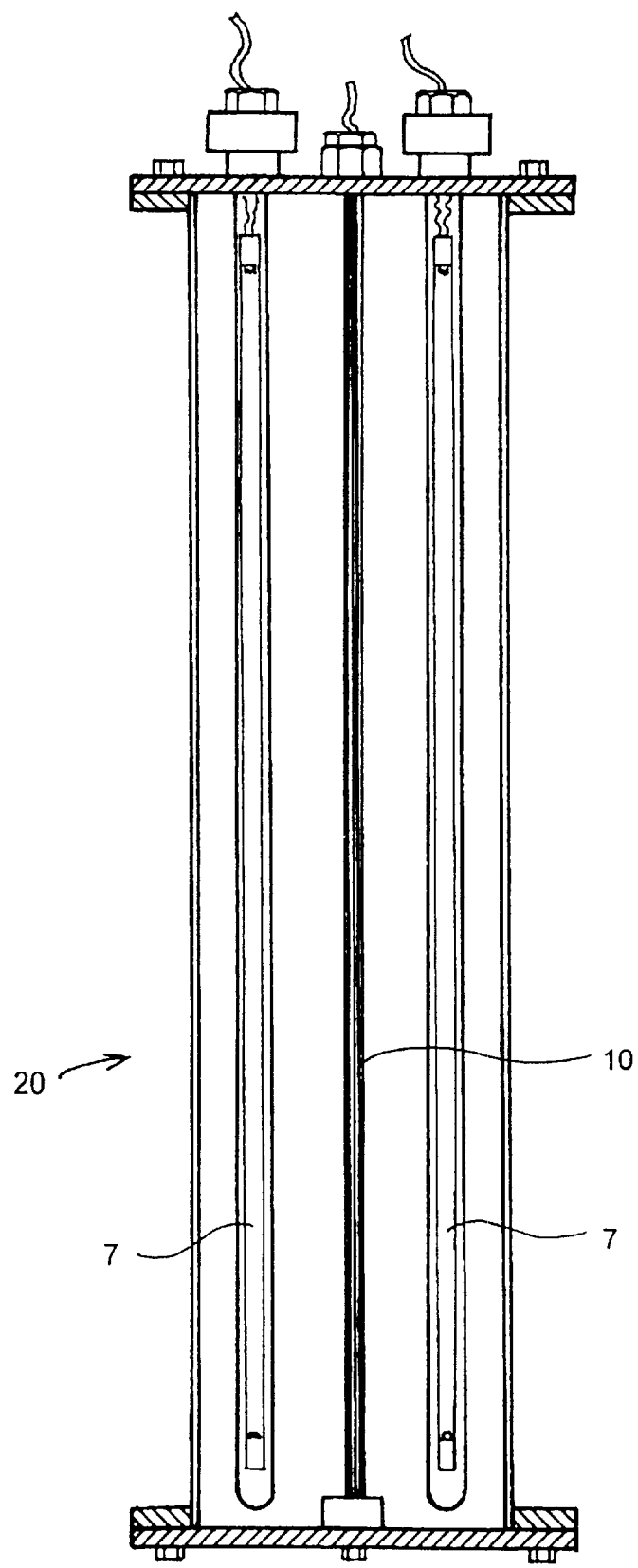
FIG. 4 shows a sectional view of a reaction container for a system according to a second aspect of the invention.

FIG. 4 shows a reaction container 20 according to a first embodiment of the second aspect of the invention wherein a plurality of UV lamps 7 is arranged in a circle around the centrally positioned cable-shaped light intensity sensor 10 according to the invention. As will be seen from FIG. 4, the intensity sensor 10 is arranged in parallel with the UV lamps 7 at least in their entire length. In the reaction container 20, the water is admitted at one end of the container and is discharged at the other end (not shown).

Figure 5:
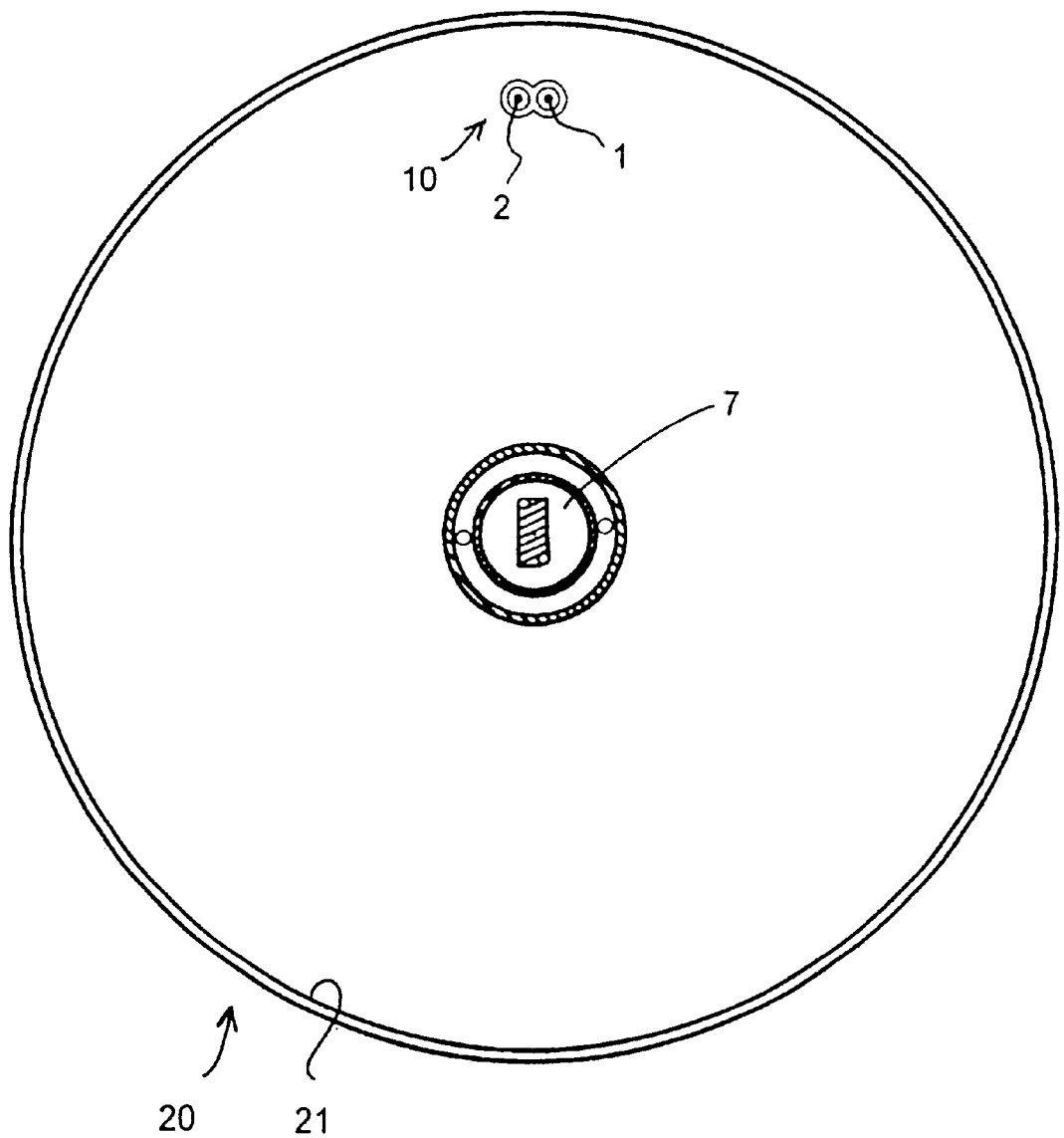
FIGS. 5 to 8 show cross-sectional views of the container with various arrays of lamp devices and sensor devices.

FIG. 5 shows a cross-section of a container 20 in which just one UV lamp 7 is positioned. In this embodiment, the lamp 7 is positioned in the center so that the entire volume of the container is irradiated with the same intensity. The cable 10 for intensity measurement according to the first aspect of the invention is here positioned somewhat away from the inside wall 21 of the container, which preferably includes a reflecting material. The cable 10 is oriented so that both light guides 1, 2 are positioned in such a manner that they are both exposed to the same UV light energy from the lamp 7.

Figure 6:
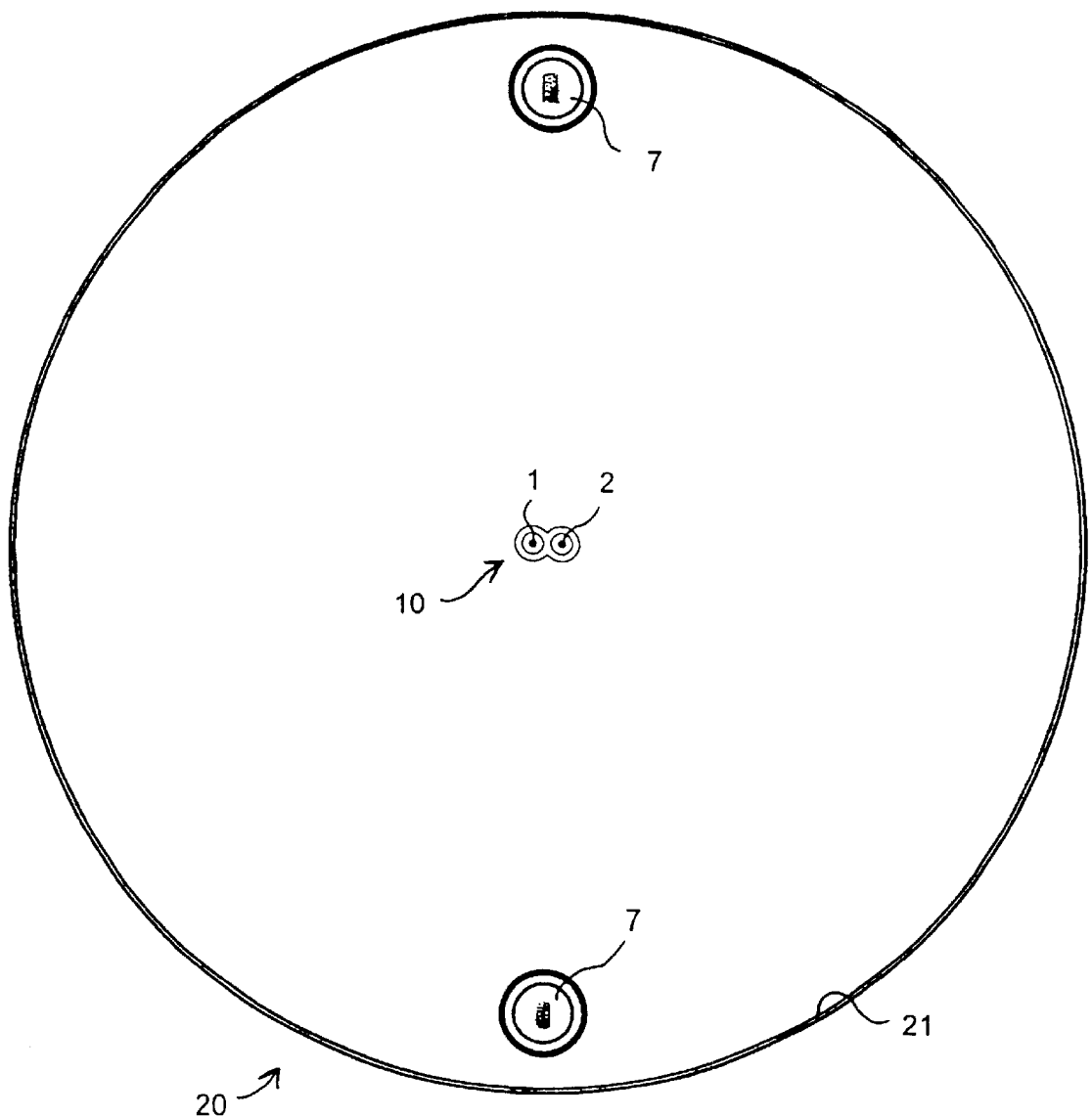

In FIG. 6, the intensity sensor 10 is placed in the center of the cylindrical container 20. In this embodiment, the lamp device in the container consists of two lamps 7 which are positioned at opposing sides of the cable 10 in such a manner that both light guides 1, 2 are irradiated uniformly.

Figure 7:
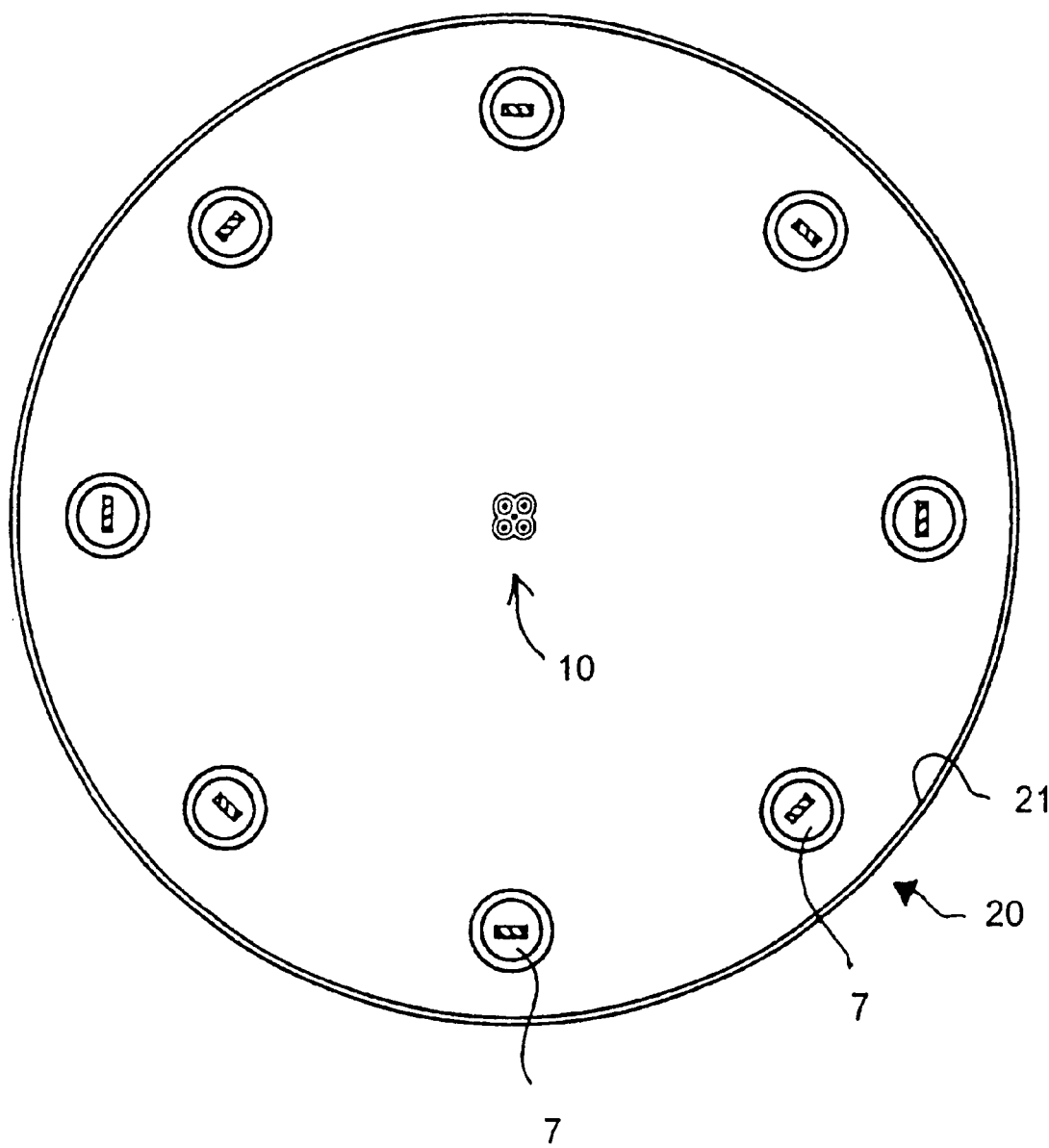

In FIG. 7, eight UV lamps 7 are arranged in a circle around the center in the container 20, where a "double" cable 10 for intensity measurement is arranged. In case of a larger number of lamps 7 a cable 10 having two or even more sets of light guides is preferred, in order to obtain a measurement of the light intensity as satisfactory as possible. This applies even more in connection with the lamp device shown in FIG. 8, where UV lamps are arranged in two circles, viz. an inner circle 7' with four lamps and an outer circle with twelve lamps 7". As the intensity sensor 10 has a great sensitivity, even this lamp device allows detection of a defective lamp, irrespective of its position in the lamp device.

Figure 8:
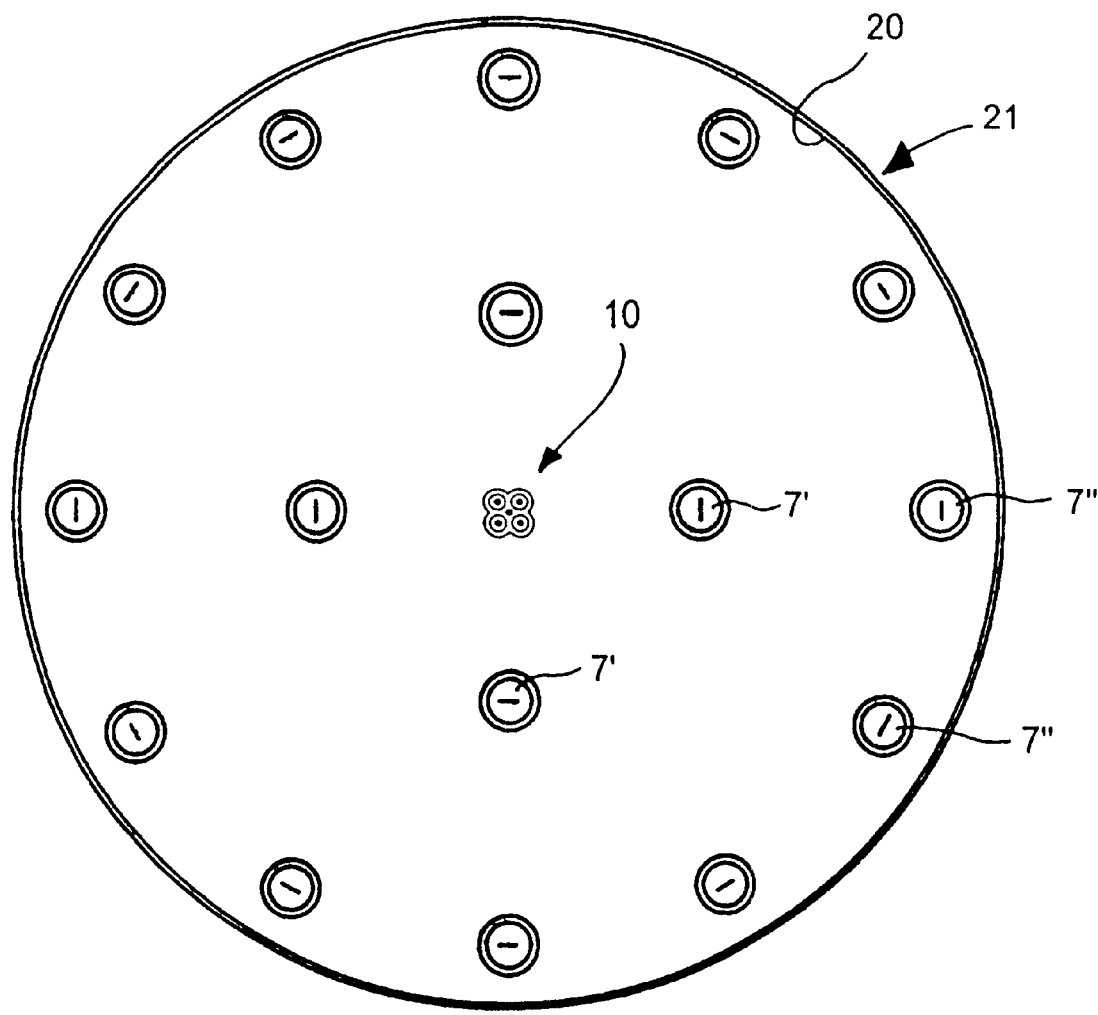

In all the embodiments shown in FIGS. 6–8, the center in the container is likely to be the weakliest illuminated point in the circular container 20. Measuring the intensity of UV light at the center provides the certainty that the minimum of energy effective to disinfect the water in the reaction container is constantly monitored.

In other embodiments, where a high performance of the container is desired in for the purpose of inactivation of bacteria, virus, etc., lamps may be arranged in three as well as four circles. The proportion between the numbers of lamps in each circle, however, must be adapted so that the mutual spacings of the lamps are similar, and similar to the distance to the sensor device positioned at the center. For drinking water having a transmittance of about 0.98–0.80, a circle of 2–9 UV lamps may be used. In case of two circles, the lamps are distributed with 4 in the inner circle and 8 in the outer one, or 8 and 12, or 9 and 16. In case of three circles, 4 are placed in the inner circle, 6 in the intermediate one and 20 in the outer one. For industrial water having a transmittance of about 0.80–0.50, 1 or 3 lamps may be positioned in each circle. With two circles, 1 is placed in the center and 6 around it. With 3 circles, 1 is placed in the center, 6 around it and 12 in the outer circle. If the system is extended with a fourth circle, 18 are placed in that one, and, in case of an additional circle, 24 will be placed in that one. A typical distance to the container wall is 17.5 mm, alternatively 27.5 mm and between the pipes 70 mm.

Figures 11, 12:
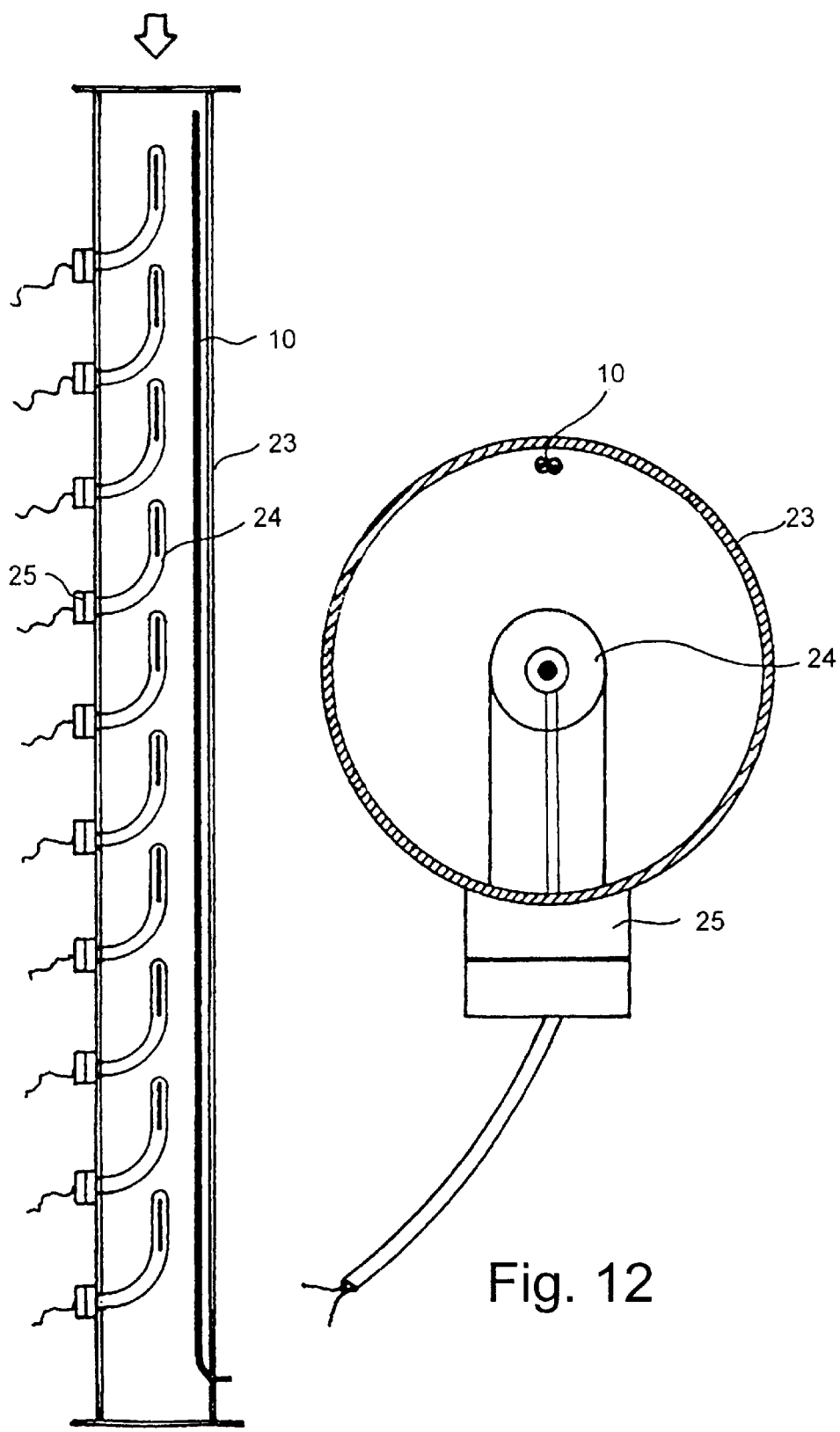
FIG. 11 shows a longitudinal section in a reaction container for a system according to the invention.
FIG. 12 shows a cross-section of the reaction container according to FIG. 11.

FIGS. 11 and 12 of the drawing show a system corresponding to the one of FIG. 5, with the variation that the container in this embodiment comprises a tubular channel 23 with a plurality of specially constructed UV lamps 24 positioned along the longitudinal axis. The lamps are secured by a socket 25 in the sidewall of the channel 23. From the socket the lamp glass arcuately extends into a rectilinear portion, which is arranged in the central line of the channel. The intensity sensor 10 is positioned at the sidewall of the channel opposite the mounting socket of the lamps and extends uninterruptedly in the longitudinal direction of all the lamps, i.e. the UV energy is measured in the entire active length of the channel.

Figure 13:
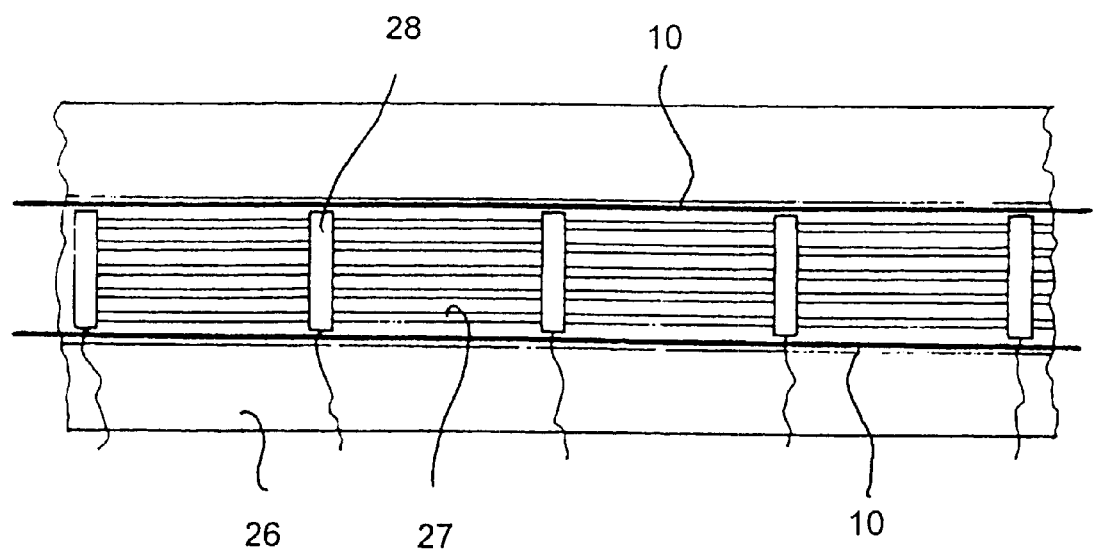
FIG. 13 shows a longitudinal section in a channel-shaped reaction container for a system according to the invention.
Figure 14:
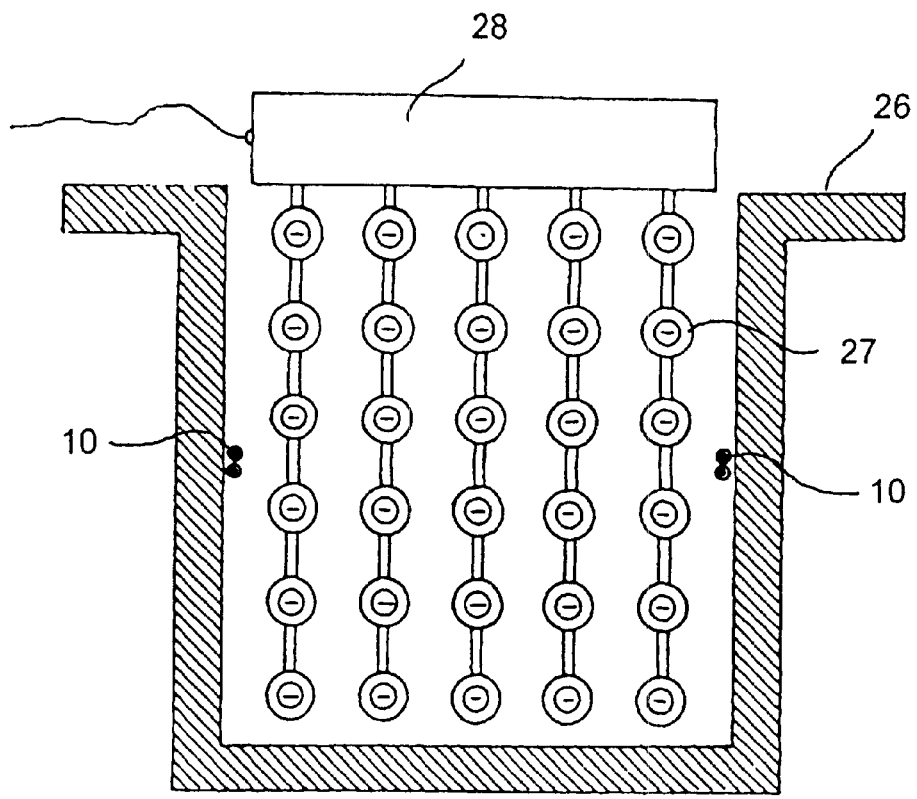
FIG. 14 shows a cross-section of the reaction container according to FIG. 13.

FIGS. 13 and 14 of the drawing show a reaction container in the form of an open concrete channel 26. A plurality of cartridges having UV low-pressure lamps 27 is mounted in the channel. The electrical installation is gathered in a box 28 at one end of the cartridges. A number of carrying rods with sockets for the UV lamps extend down from the boxes 28. It will be appreciated that the installations are watertight. Light intensity sensors 10 are mounted at each side of the channel centrally on the sides in the entire active length of the channel, allowing an unprecedented accurate measurement of the UV light intensity in a simple and safe manner.

Although specific embodiments have been described above it is emphasized that the invention may be exercised in several ways and that the explanation given above exclusively serves to clarify the invention and not to limit the scope of protection conferred, which is exclusively defined by the appended claims.

I claim:

1. A sensor device for intensity measurement of ultraviolet (UV) light inside a container carrying a flow of a liquid, comprising a light guide means and a photodetector means, wherein said light guide means comprises two doped light guides, and two differently doped edge glass filters, each of said edge glass filters enclosing a respective one of said light guides, and wherein said photodetector means comprises a respective photodetector positioned at a first end of each of said light guides.

2. The device according to claim 1, comprising a respective reflection means arranged at a second end of each of said light guides.

3. The device according to claim 1, wherein a first one of said edge glass filters is doped to a filter wavelength of about 245 nm.

4. The device according to claim 1, wherein a second one of said edge glass filters is doped to a filter wavelength of about 260 nm.

5. The device according to claim 1, wherein at least one of said light guides is doped for conversion of ultraviolet electromagnetic energy fed through the edge glass filters into visible light.

6. The device according to claim 5, wherein said visible light is at a wavelength of about 430–470 nm.

7. The device according to claim 1, wherein the photodetector means comprises a silicon photodiode.

8. The device according to claim 1, wherein the photodetector means comprises a silicon monocrystal photodiode.

9. The device according to claim 1, wherein two of said edge glass filters are embedded in a jacket of transparent material, said jacket providing two or more conduits for respective edge glass filters, said conduits being arranged in pairs.

10. The device according to claim 9, wherein said transparent material is quartz glass.

11. The device according to claim 1, comprising an outer shield doped as a grey filter in order to adapt the level of the light energy passed to said light guides.

12. The device according to claim 9, wherein the photodetector means comprises a silicone photodiode.

13. A photochemical UV treatment system, comprising a container carrying a flow of a liquid, which container is provided with at least one UV lamp, and a sensor device for intensity measurement of ultraviolet (UV) light inside said container, said sensor device comprising a light guide means and a photodetector means, wherein said light guide means comprises two doped light guides, and two differently doped edge glass filters, each of said edge glass filters enclosing a respective one of said light guides, and wherein said photodetector means comprises a respective photodetector positioned at a first end of each of said light guides.

14. The system according to claim 13, wherein said container comprises a channel with a polygonal or circular cross-section, wherein an array of UV lamps are arranged uniformly along a circle, and wherein said sensor device is arranged at the center of the circle in parallel with the lamps.

15. The system according to claim 13, wherein said container is provided on an inside wall with a reflecting surface adapted for reflecting UV radiation towards the center.

16. The system according to claim 13, wherein said lamps are arranged along two concentric circles in such a manner that none of the lamps shade each other relative to said sensor device.

17. The system according to claim 13, wherein said UV lamp is positioned in the center of the container and said sensor device is positioned adjacent a wall of said container.

18. The system according to claim 13, wherein said container comprises a channel with a polygonal, a rectangular or a circular cross-section, wherein an array of UV lamps are arranged uniformly along the longitudinal direction of the channel as well as along its cross-section, and wherein a sensor device is arranged along the longitudinal direction of the channel, adjacent an inside wall of said channel.

* * * * *